United States Patent [19]

Peaslee et al.

[11] Patent Number: 5,303,321
[45] Date of Patent: Apr. 12, 1994

[54] INTEGRATED HARDWARE GENERATOR FOR AREA FILL, CONICS AND VECTORS IN A GRAPHICS RENDERING PROCESSOR

[75] Inventors: John M. Peaslee; Jeffrey C. Malacarne, both of Chino Hills, Calif.

[73] Assignee: Hughes Aircraft Company, Los Angeles, Calif.

[21] Appl. No.: 582,728

[22] Filed: Sep. 14, 1990

[51] Int. Cl.$^5$ .............................................. G06F 15/62
[52] U.S. Cl. .................................. 395/143; 395/133; 395/134; 395/162
[58] Field of Search ............................. 395/125–130, 395/133–139, 140–143, 162; 340/799; 345/133, 135–138, 147, 149

[56] References Cited

U.S. PATENT DOCUMENTS

| | | | |
|---|---|---|---|
| 4,507,656 | 3/1985 | Morey et al. | 345/17 |
| 4,807,158 | 2/1989 | Blanton et al. | 395/125 |
| 4,894,653 | 1/1990 | Frankenbach | 340/799 |

FOREIGN PATENT DOCUMENTS 0218984 4/1987 European Pat. Off.
0327002 8/1989 European Pat. Off.

OTHER PUBLICATIONS

Foley et al. Computer Graphics Principles and Practice pp. 950–961, 116–125, 980–983 (1990).
Computers & Graphics, vol. 10, No. 1, 1986, "Fast Hardware Graphic Generators of Curve Families", C. Alia, et al. pp. 27–36.

*Primary Examiner*—Mark K. Zimmerman
*Assistant Examiner*—Almis Jankus
*Attorney, Agent, or Firm*—W. K. Denson-Low

[57] ABSTRACT

An integrated hardware generator for generating digital signals representative of vectors, polygons and conics primitives and area fills therefor. The primitive signals are used in the formation of a final digital output signal read into a bit map memory of a graphics display processor. Its operation is based on applying one or more of a set of internal subfunctions to generate mathematical solutions for rendering each geometric shape as a graphics primitive digital signal. The basic building block of the generator is a digital differential analyzer which is adapted to accumulate fractional (subpixel) components of x/y coordinate data and to signal when the accumulation overflows across pixel boundaries. This occurrence enables an increment or decrement of the x/y coordinates that indicate the pixel address to be loaded (drawn). The digital differential analyzer forms an independent vector generator and comprises a pair of input differential multiplexers, an arithmetic logic unit and a register file. On receipt of a command from a host processor the multiplexers receive parameters that specify the primitive to be drawn and select the appropriate parameters for input to the arithmetic logic unit. The arithmetic logic unit accumulates parameters and stores the results in the register file. The output of the register file is fed back to the multiplexers to provide inputs fr the next operation.

2 Claims, 6 Drawing Sheets

INTEGRATED HARDWARE GENERATOR FOR AREA FILL, CONICS AND VECTORS IN A GRAPHICS RENDERING PROCESSOR

CROSS REFERENCE TO RELATED APPLICATIONS

The present application is related to contemporaneously filed patent applications: Ser. No. 07/582,697 filed on Sep. 14, 1990, entitled "Multifunction High Performance Graphics Rendering Processor," Ser. No. 07/582,709 filed Sep. 14, 1990, entitled "Dual Hardware Channels and Context Switching in a Graphics Processor," Ser. No. 07/582,710 filed on Sep. 14, 1990, entitled "Concurrent General Purpose and DMA Processing in a Graphics Rendering Processor," Ser. No. 07/582,696 filed on Sep. 14, 1990, entitled Dual Programmable Block Texturing and Complex Clipping in a Graphics Rendering Processor, Ser. No. 07/582,694 filed on Sep. 14, 1990, entitled "Hardware Bit Block Transfer Processor," Ser. No. 07/582,693 filed on Sep. 14, 1990, entitled "Hardware Symbology and Text Generator in a Graphics Processor," and Ser. No. 07/582,695 filed on Sep. 14, 1990, entitled "Multiprocess Scheduler in a Graphics Processor," all by John M. Peaslee and Jeffrey C. Malacarne, whose teachings are incorporated herein by reference.

BACKGROUND

The present invention relates generally to digital graphic display processors and particularly to programmable integrated hardware area fill, conics and vector generators forming a working part of a graphics generator that is used as a component of the graphic display processor.

Real time digital electronic displays are used in many applications such as miliary command and control workstations and air-traffic control systems. In these displays, the displayed information typically comprises real-time processed data generated by a host processor adapted to receive the basic real-time information from one or more radars, communications systems and/or other data processors. These data are then combined with one or more graphic primitives, such as a circle, ellipse or polygon, along with generated alphanumerics, mask areas and texture patterns to provide a relatively easily understood comprehensive graphic display on an output device such as cathode-ray tube. In contemporary systems, the various components of the graphics display such as the graphic primitives, mask windows, fill texturing and the like are provided either by a general purpose computer based graphics generator or by a hardware specific graphics generator. Of these, general purpose graphics generators offer system versatility but usually must sacrifice some degree of system performance for ease of programming. On the other hand, hardware specific graphics generators, called cogenerators, provide good system performance.

Increasing demands on military command and control systems, military and civil air-traffic control systems and the like have created a need for high performance graphics cogenerators which, in addition, provide a versatile and easily implemented programming capability. A key element in such a cogenerator is a processor capable of generating a multiplicity of filled areas, and circular, elliptical and polygonic shapes. These shapes may be directly placed onto the display screen and color and texture information may be applied within the areas and shapes to form the final output display. In contemporary graphics cogenerators, area fill generators are typically slow, or are simple, single channel devices which require repetitive retrieval of information from a remote memory and which are therefore capable of providing only a limited range of output display forms in the time allotted for such provision during system cycling. It is therefore desirable to provide a programmable integrated hardware graphics generator which is capable of producing a wide variety of filled areas, and circular, elliptical and polygonic output forms without slowing the overall speed of system operation.

SUMMARY OF THE INVENTION

In its broadest aspects, the present invention is a programmable integrated hardware, dual input channel area fill, vector, circle, ellipse, and polygon generator for use in a graphics cogenerator. Its operation is based on applying one or more of a set of internal subfunctions to generate mathematical solutions for rendering each geometric shape as a graphics primitive digital signal. The cogenerator further comprises means for combining this digital signal with other digital signals representing either alphanumeric and other symbols, and/or with texture pattern and clip mask signals, and for sending the combined digital signal to a multilayer bit map memory for ultimate display on a cathode ray tube or other output device.

In one embodiment of the invention, the basic building block of the generator is one or more digital differential analyzers which are adapted to accumulate fractional (subpixel) components of x/y coordinate data and to signal when the accumulation overflows across pixel boundaries. This occurrence enables an increment or decrement of the x/y coordinates that indicate the pixel address to be loaded (drawn). Each digital differential analyzer forms an independent vector generator and comprises a pair of input differential multiplexers, an arithmetic logic unit and a register file. On receipt of a command from a host processor the multiplexers receive parameters that specify the primitive to be drawn and select the appropriate parameters for input to the arithmetic logic unit. The arithmetic logic unit accumulates parameters and stores the results in the register file. The output of the register file is fed back to the multiplexers to provide inputs for the next operation. Such an arrangement provides a general purpose computing architecture capable of solving a wide variety of different geometric equations.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figures 1, 5:
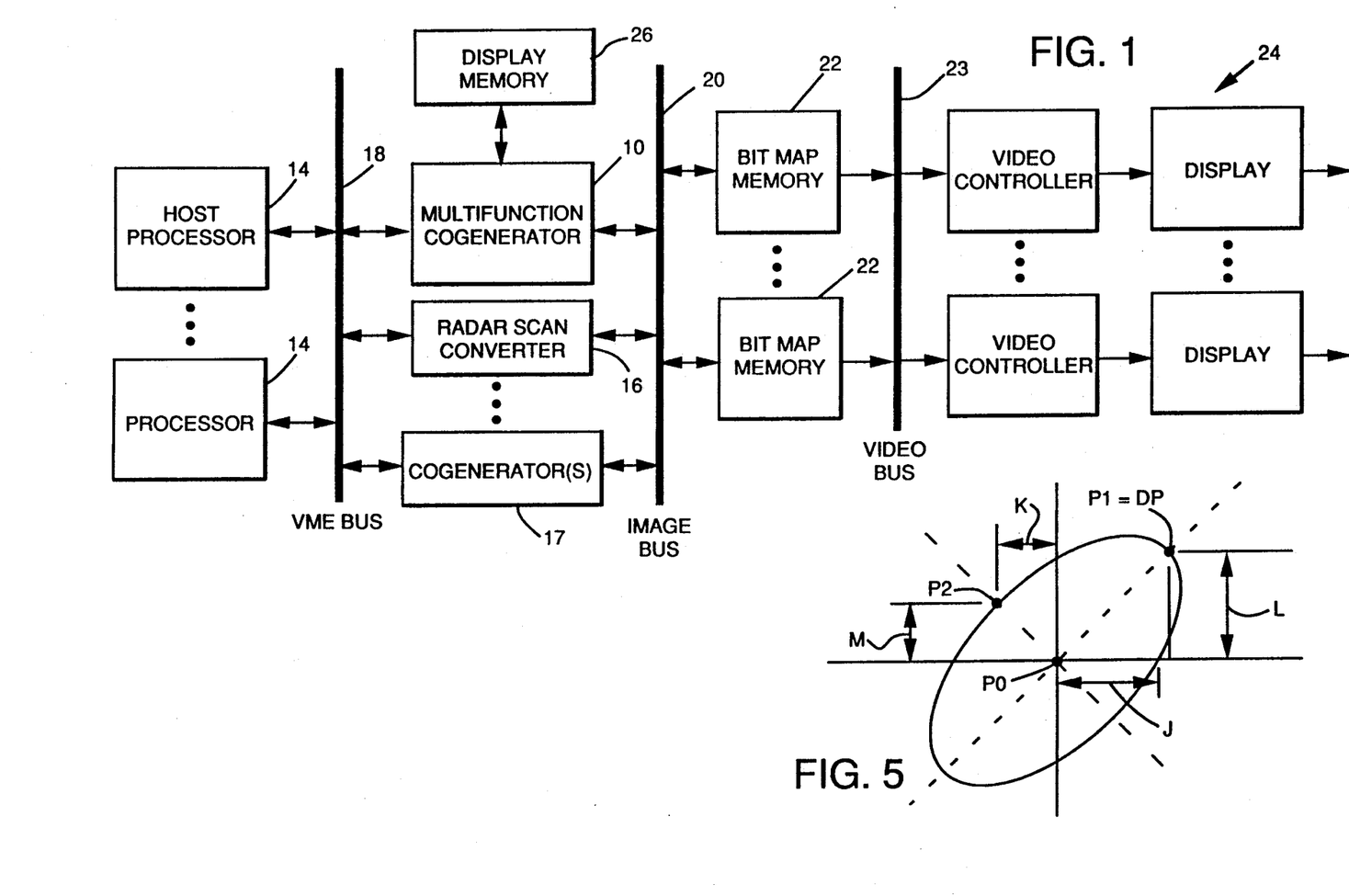
FIG. 1 is a block diagram of a system incorporating a dual channel multifunction cogenerator of which the present invention forms a part.
FIG. 5 shows the conic projections used in defining elliptical functions.

Referring now to FIG. 1, there is shown a block diagram of a system incorporating a multifunction cogenerator (MCG) 10 of which a primitive generator of the present invention forms a functionally distinct part. The cogenerator 10 shown is a dual channel, high performance graphics rendering processor which provides unique solutions for a wide variety of graphics system applications. It is a hardware based device which operates in conjunction with one or more general purpose data processing systems such as a military command and control system, said system further comprising one or more real time-host processors 14 and other real time data generating devices, such as a radar scan converter 16 or additional cogenerators 17. The host processor(s) 14, radar scan converter 16 and other cogenerators 17 feed data into the cogenerator 10 by way of a multifunction bus 18, and the data is combined with graphics data generated within the cogenerator 10. The combined data are then output as a set of signals for the generation of a graphics display by way of a 64-bit bidirectional, multiuser, interconnect image bus (IBUS) 20 to a bit mapped memory (BMM) 22 by way of a video bus 23 to a display system 24.

Figure 2:
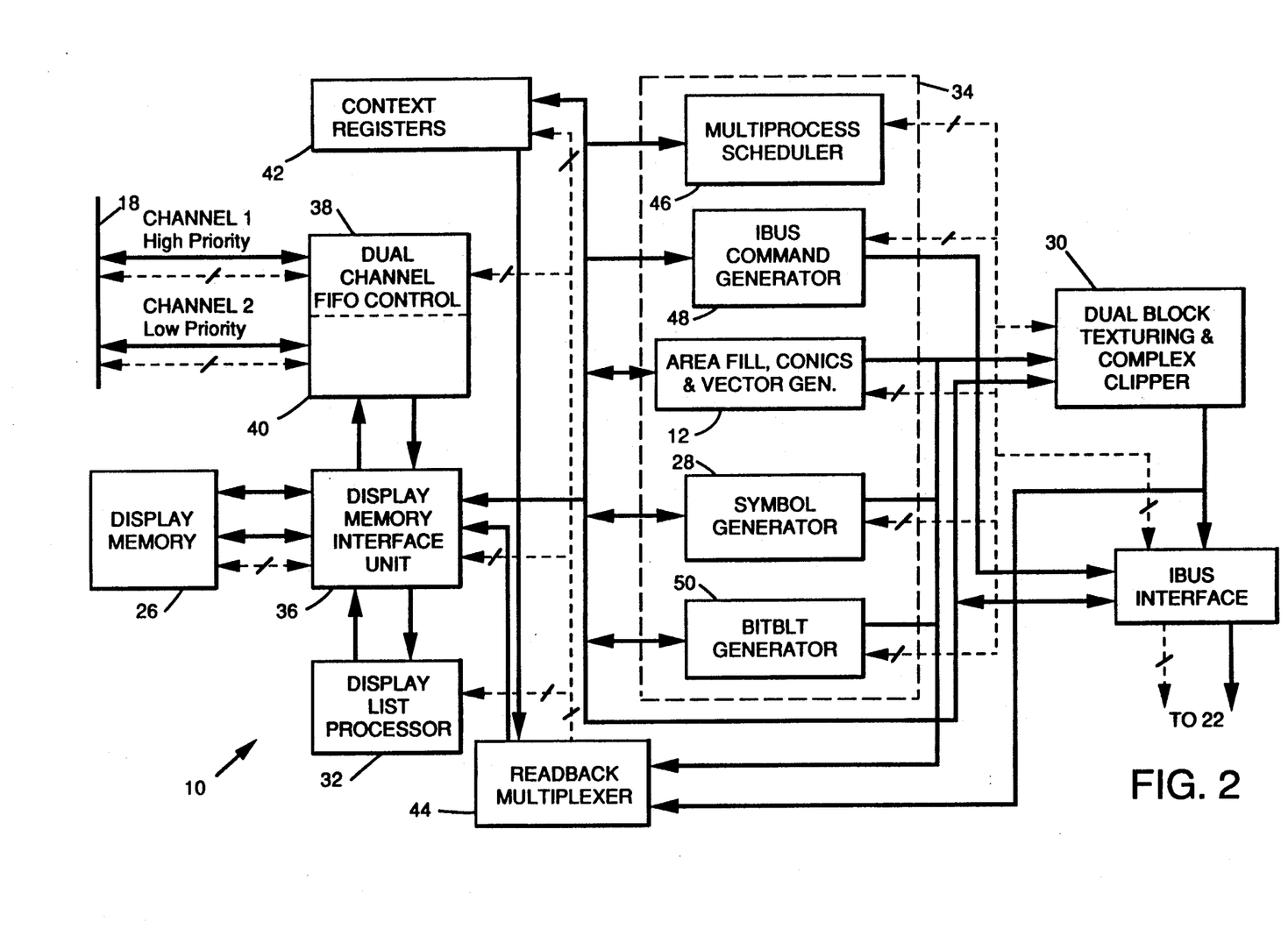
FIG. 2 is a detailed block diagram of the multifunction cogenerator of FIG. 1 of which the present invention forms a part.

As shown in the embodiment illustrated in FIG. 2, the cogenerator 10 includes a tri-ported display memory 26. This has a memory address space, in a working embodiment, of 4 megabytes by 32 bits and is used to store all commands and parameters required for cogenerator 10 to function properly, with appropriate buffer logic. The display memory is accessible by a display list processor (DLP) 32, an internal graphics generator 34 and the host processor 14. The host processor 14 reads and writes to the cogenerator 10 and to perform random reads and writes at any address within the display memory 26 address space. The cogenerator 10 monitors the input of data from the host processor 14 to the display memory 26 to synchronize updating of data from the host processor 14 with the output of graphics signals from the cogenerator 10. A display memory interface unit (DMIU) 36 performs the actual memory cycles within display memory 26. It is essentially a tri-port memory controller.

In operation, the cogenerator 10, under the command of the host processor 14, fetches instructions from the display memory 26 and processes these instructions to first calculate and then "draw" processed signals representing the calculated figure into the bit mapped memory 22 by way of the image bus 20. Drawing is performed by entering a set of binary 1 and 0 signals into individual selected memory locations of the bit mapped memory 22. As a functionally distinct part of the cogenerator 10, an area fill generator 12 in accordance with the present invention creates signals representing graphic primitives such as polylines, rectangles, circles, ellipses and polygons and area fills therefor. These primitives signals are combined with other signals representing alphanumeric and other symbols, which are generated in a symbol generator 28, and with yet a third set of signals generated by a block texturing clipper 30 to produce the final graphics signal which is then read into a pixel address in the bit mapped memory 22. Typically, the bit map memory 22 has multiple memory layers which set the color and intensity for the graphics display pixels defined at each memory location.

Stored in the display memory 26 are two first in, first out (FIFO) memory buffers 38, 40, one of the buffers being assigned a higher priority than the other and there being one buffer for each of two drawing channels. An address stack is internally provided in each FIFO buffer to store subroutines calls. There is also an attribute stack to store all internal cogenerator attributes for hardware context switching, a sin/cosine table for drawing graphics, up to 128 font tables to draw stroked and/or dot matrix symbols and characters and finally a large display list region. A more detailed description of the cogenerator 10 is given in copending, commonly assigned U.S. patent application Ser. No. 07/582,697, filed on Sep. 14, 1990 entitled, "Multifunction High Performance Graphics Rendering Processor," the teachings of which are incorporated herein by reference.

The dual channel FIFO buffers 38, 40 interface the cogenerator 10 to the host processor 14. The FIFO buffers 38, 40 are responsible for performing all interfacing duties such as proper "handshaking" when the bus 18 is performing data transfers, when the host processor 14 reads or writes to the data memory 26. It is the FIFO buffers 38, 40 that perform the read or write operations to the display memory 26 for the host processor 14. The FIFO buffers 38, 40 are also responsible for arbitrating high and low priority channels to the multifunction cogenerator 10. A more detailed description of these functions is given in copending commonly assigned U.S. patent application Ser. No. 07/582,709, filed on Sep. 14, 1990 entitled "Dual Hardware Channels and Context Switching in a Graphic Processor," the teachings of which are incorporated herein by reference.

The display list processor 32 performs all command and display list processing for the cogenerator 10. Typically, commands are sent to the cogenerator 10 from the host processor 14. The display list processor 32 handles the various ways that commands can be sent to the cogenerator 10. The display list processor 32 interfaces to display memory 26 using the display memory interface unit 36, reads commands from the FIFO buffers 38, 40, as well as performing other functions. When a command is given to the display list processor 32, it processes the command and determines what action to take.

Context registers (CREG) 42 store the cogenerator attributes which define the current state of the cogenerator 10. These include parameters such as the cogenerator operational mode; draw pointer position; foreground color; background color; clipping window dimensions; etc. These attributes are important as they define the "personality" of the cogenerator 10 at any given time, and all of them are user programmable. This gives a user a considerable degree of flexibility in operating the display system.

Also provided is a readback multiplexer (RDMUX) 44 which is a large data multiplexer. It is used to multiplex data to the DMIU 36 from which they will then be directed to the display memory 26 or back to the host processor 14 by way of the bus 18. Multiple sources of readback data include the CREG 42, graphics generator 34 and block texturing and complex clipper processor 30. If the data are intended for the host processor 14, it will be sent through the FIFO buffers by DMIU 36. The graphics generator 34 is connected to the readback multiplexer for various cogenerator drawing operations. The block texturing and complex clipper processor 30 also sends data to the readback multiplexer 44.

That part of the cogenerator 10 wherein the generation of the primitives and symbols occurs is contained within the dotted block of FIG. 2, identified as block 34. To perform these functions, there are included within block 34, along with the area fill generator 12 of the present invention, a multiprocess scheduler 46, a command generator 48, the symbol generator 28 and bit block transfer generator (BITBLT) 50.

The multiprocess scheduler 46 controls all data transfers between the elements within block 34, the command generator 48 enables the image bus 20 to receive output data and transport it to the bit map memory 22, the symbol generator 28 generates alphanumeric signals and the BITBLT generator 50 provides a general purpose means for moving rectangular blocks of image data both within the bit block memory 22 and the display memory 26 and between them. The block texturing and complex clipper 30 receives the digital output signals from the area fill and symbol generators 12, 28, combines them and then further processes the combined signal into the final output display which is then read into the bit map memory 22 for use with the video display system 24. Details as to how this is done are contained in copending commonly owned U.S. patent application Ser. No. 07/582,696, filed on Sep. 14, 1990, entitled "Dual Programmable Block Texturing and Complex Clipping in a Graphics Rendering Processor." Most of the components shown within the boundaries of block 34 are themselves the subject of one or more copending, commonly owned U.S. patent applications. Among these are Ser. No. 07/582,694, filed on Sep. 14, 1990, entitled "Hardware Bit Block Transfer Processor," Ser. No. 07/582,693, filed on Sep. 14, 1990, entitled "Hardware Symbology and Text Generator in a Graphics Generator," Ser. No. 07/582,695, filed on Sep. 14, 1990, entitled "Multiprocess Scheduler in a Graphics Processor," Ser. No. 07/582,710, filed on Sep. 14, 1990 entitled "Concurrent General Purpose and DMA Processing in a Graphics Rendering Processor", and Ser. No. 07/582,695, filed on Sep. 14, 1990 entitled "Multiprocess Scheduler in a Graphics Processor." The teachings of all of the above listed patent applications are incorporated herein by reference.

Figure 3:
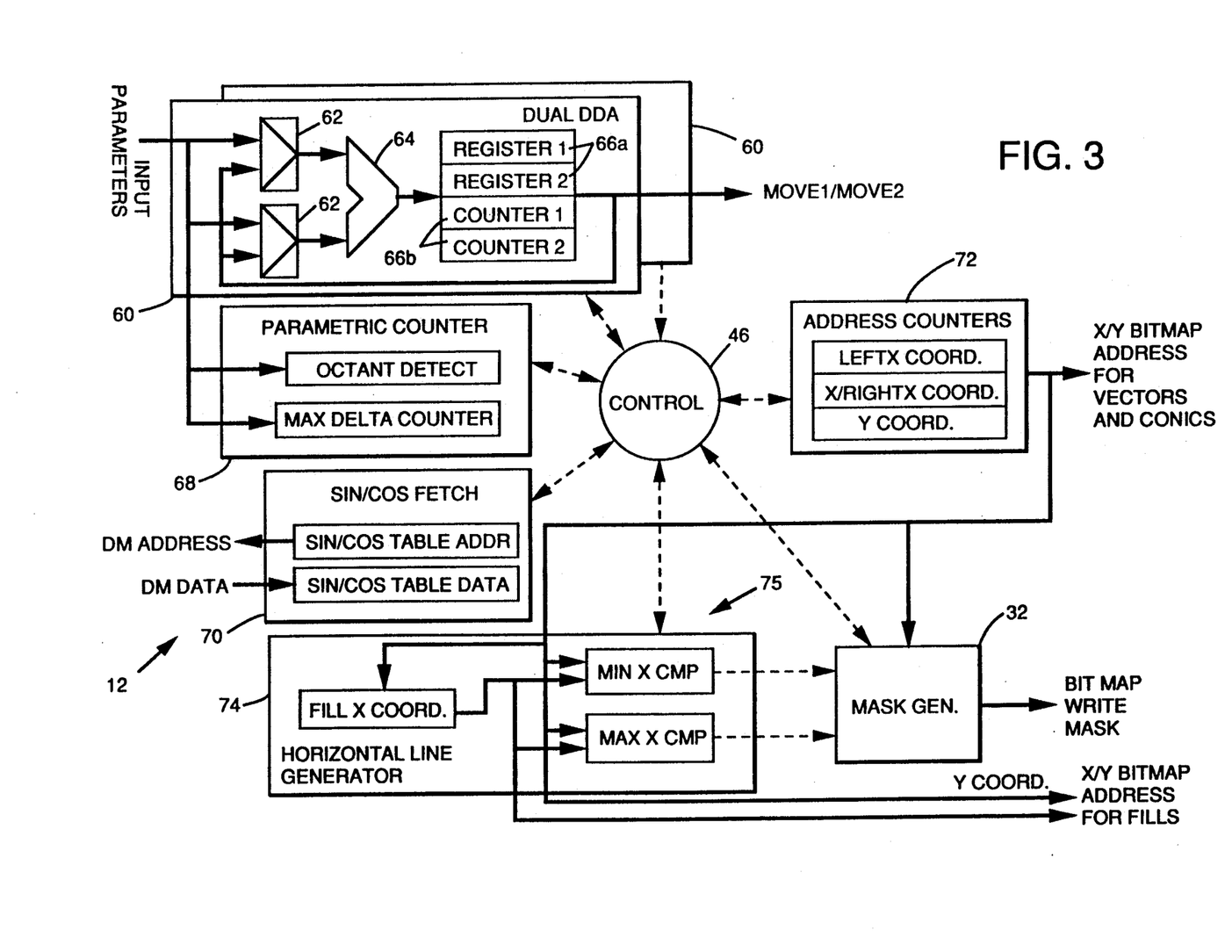
FIG. 3 is a functional block diagram of the integrated hardware area fill, vector, circle, ellipse and polygon generator of the present invention.

Referring now to FIG. 3, the integrated hardware generator 12 of the present invention is shown in more detail. In overview, the generator 12 is a single circuit which generates vectors, circles, ellipses and polygon area fills. The basic building block of the generator is a digital differential analyzer (DDA) 60 which, in operation, accumulates fractional (subpixel) components of x/y coordinate data and signals when the accumulation overflows one or another pixel boundary. This occurrence causes the system to increment or decrement the x and y coordinates that indicate the pixel address to be loaded (drawn) in the bit map memory 22. In its most general form, the analyzer 60 has a general purpose architecture comprising input means 61, which feeds input data and instructions into at least two digital differential multiplexers 62, an arithmetic logic unit (ALU) 64 and a register file 66 comprising two registers and counters 66a, 66b.

Figure 4:
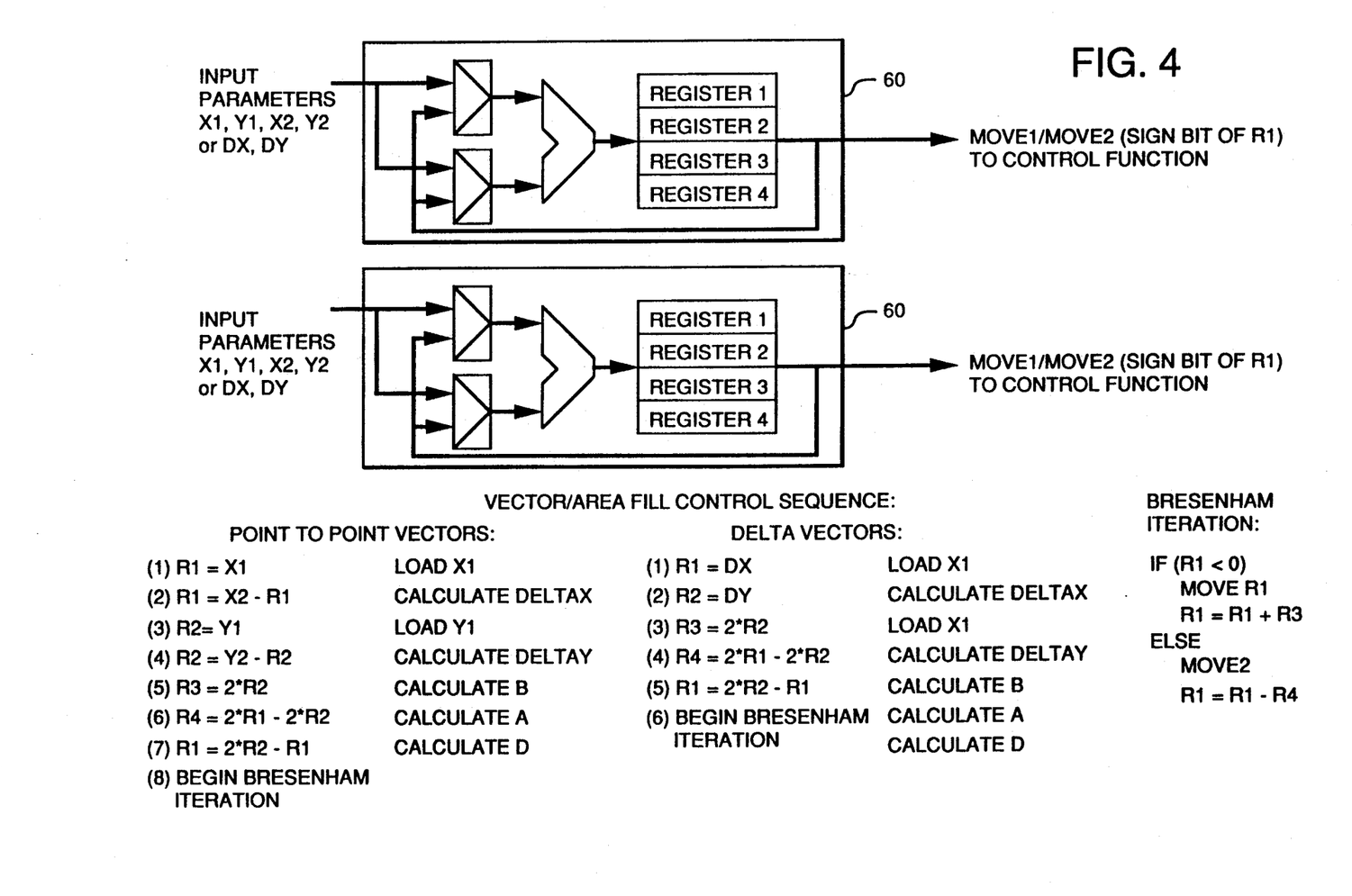
FIG. 4 is a diagram describing the control sequence used to calculate the shape of polygonic areas.
Figure 6:
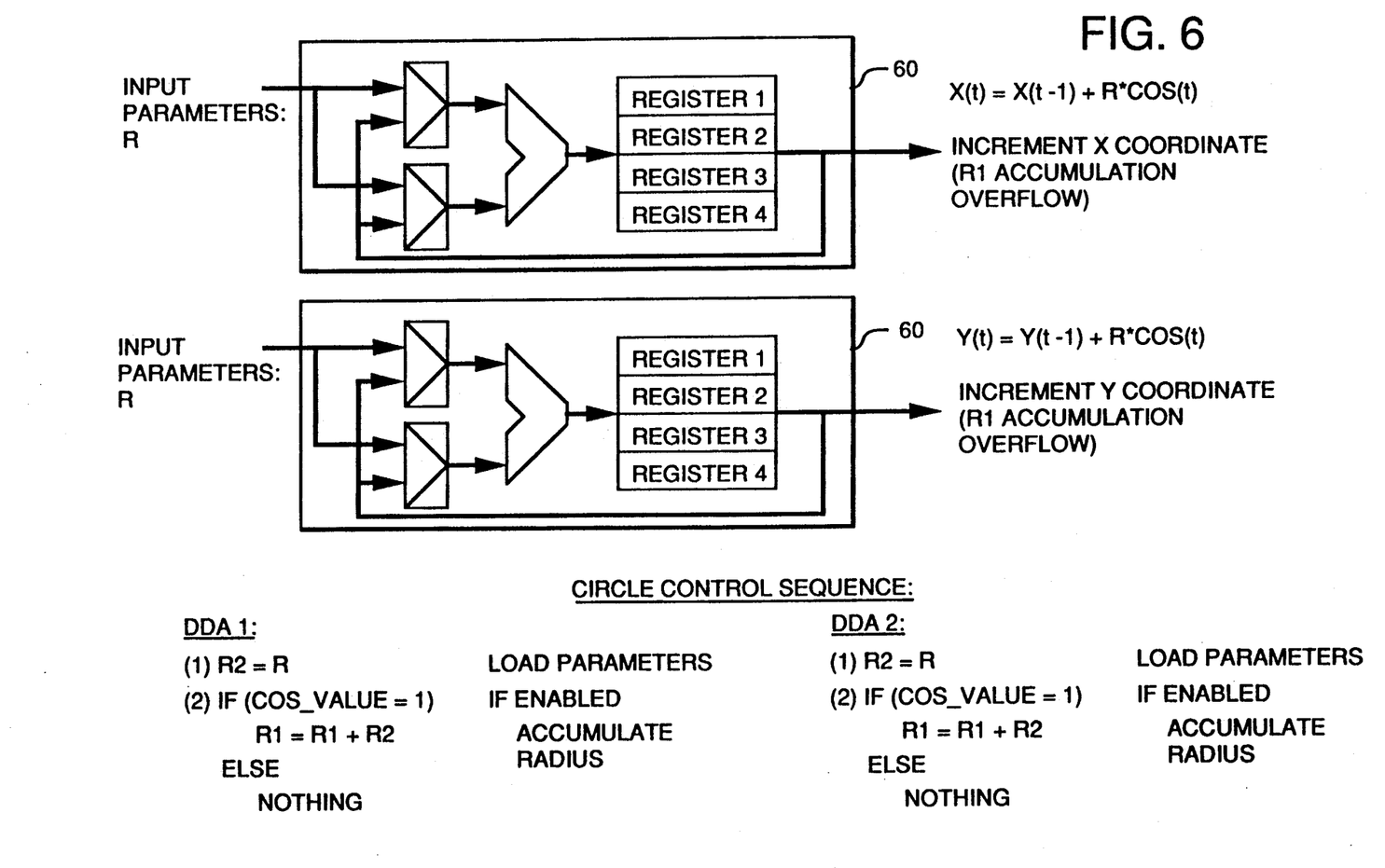
FIG. 6 is a diagram describing the control sequence used to calculate and draw circular areas.
Figure 7:
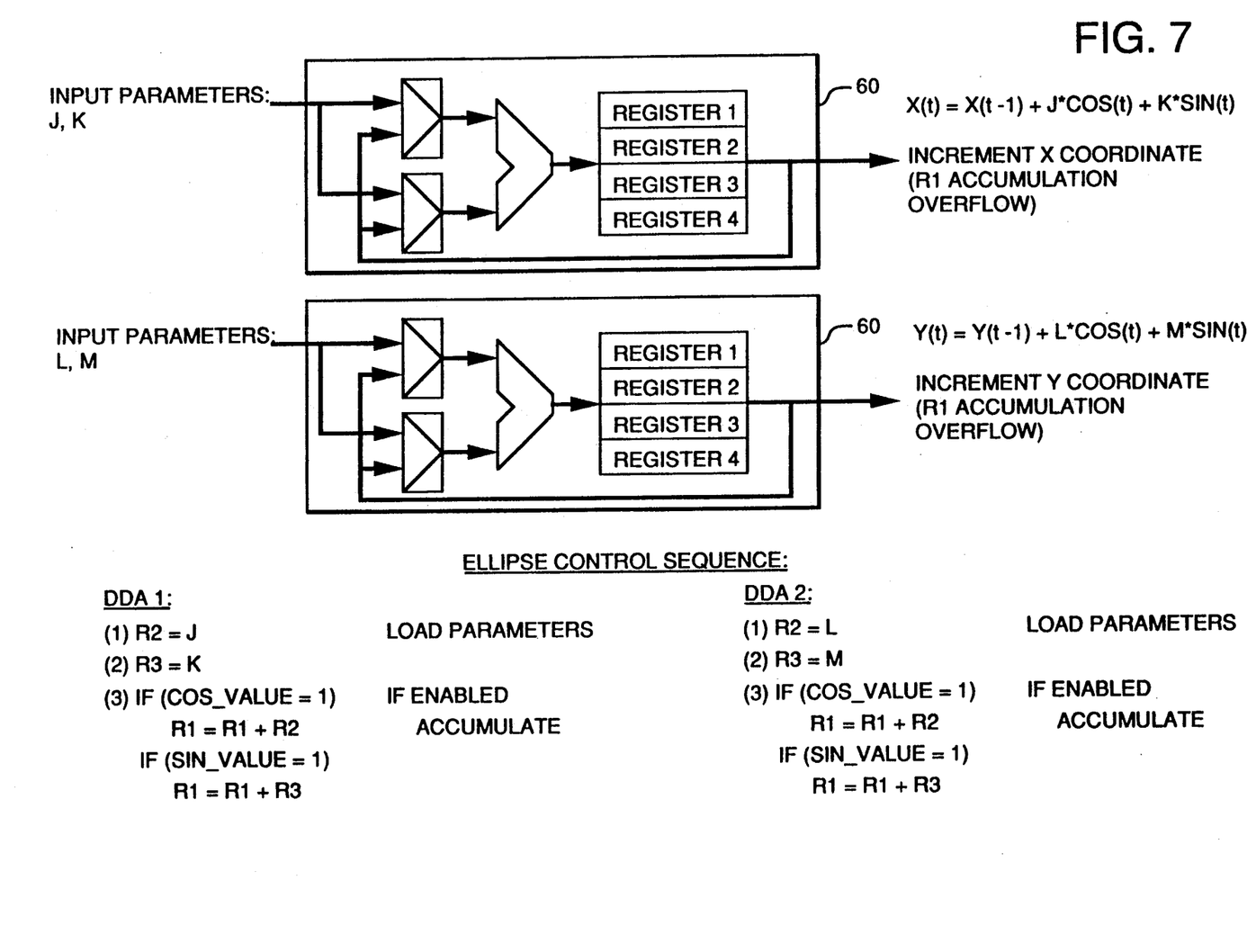
FIG. 7 is a diagram describing the control sequence used to calculate and draw elliptical areas.

In operation, the comparators 62 acquire x and y data by way of the cogenerator 10 and compare these to x and y pixel position data stored in registers 66. Whenever either the x or y data stored in the registers 66 and counters 67 indicate that a pixel boundary has been crossed, the DDA 60 outputs move direction controls for the next pixel address. This process is continued until the primitive shape is completed. In furtherance of this function, the area fill generator 12 also comprises as constituent parts thereof, a parametric counter 68, a sin/cos fetch unit 70, an address counter 72 and a horizontal line generator 74. In the configuration illustrated in FIG. 3, the system provides for considerable versatility in setting up solutions for the subfunctions used to compute the various geometric equations used within the system. Graphic descriptions of how the calculations are implemented is shown in FIGS. 4, 6 and 7.

The parametric variable counter 68 is used to determine the number of iterative calculations needed to render a given primitive or segment. For vectors and polygon generation and area fill operations, the x/y coordinates or delta x/delta y values are compared by this function to determine the maximum delta value for the line(s) being calculated. This value determines the total number of iterations required for each of these primitives or segments. For rendering circles and ellipses (i.e., conics), a normalization input parameter, which defines the total number of calculations is loaded directly.

The sin/cos fetch unit 70 is used in the rendering of conic primitives and acts to fetch and store sine and cosine control signals from one of a plurality of sin/cos tables stored within display memory 26. In one embodiment of the present invention, the system incorporates eight separate tables. These tables approximate the change in sine (cosine) by 0.707 (0.293) on a unit circle where the sine (cosine) changes by 0.707 (0.293) depending on the octant. While accuracy of the parametric conics algorithm used improves with more iterations, more iterations increase the amount of processing required to draw the conic. Each of the sin/cos tables in the display memory has a maximum allowable radius or axis length. Where conics with radii or axes < 1024 pixels in length (for example), a tradeoff would exit between desired accuracy and draw time and the system is configured to allow the user to make a choice. In this example, for conics having radii or axes > 1024 pixels, only the largest table may be used. To provide for the generation of conic sections having different values for their major and minor axes, the sin/cos fetch unit 70 may be controlled to enable the accumulation process taking place within the analyzer 60 by setting of the accumulation of the x and y components at different rates. This effectively steers what would normally be a straight line into a circular or elliptical shape.

The address counter 72 is used to store output x/y pixel coordinate addresses. It is controlled indirectly by the accumulation processes within the analyzers 60 and represents the current pixel address being drawn in the bit map memory 22. The horizontal line generator 74 is used to render horizontal lines between the left and right edges of the polygonic or conic area being filled. The edges are traced by output signals from analyzer 60, which are halted when a new horizontal line can be output. This function uses an x coordinate counter to step one 16 bit long bit map word at a time along the line from left to right. A comparator 75 detects when the right edge has been reached, at which time, the unit increments to draw another line, if one still required. The x and y address least significant bits and various control signals are used by the block clipper 30 to form a bit map write mask. This mask serves to enable only the appropriate bits of the 16-bit bit map word output at the left and right edges of the area filled. For vectors and conics, the mask generator monitors the output of the address counters and accumulates the appropriate write mask as the figure is drawn into a 16-bit bit map memory word. Whenever the address steps across a word boundary, a write cycle is performed to the bit map memory 22.

In the embodiment shown in FIG. 3, the area fill generator 12 comprises at least two identical and independent DDA functional units that permits it to solve more than one equation at the same time. In operation, the two DDA units shown are controlled differently for each unique set of equations to be solved. For example, in drawing polylines which are herein defined as being a series of connected vectors, each being at least one pixel in length. The starting point of the polyline (first pixel of the first vector) is defined as the current draw pointer (DP) value within cogenerator 10. As the cogenerator 10 draws a vector, the draw pointer value is set equal to the end point x/y position. When the endpoint is reached drawing is stopped and the draw pointer of the next vector is moved to that point, i.e., succeeding vectors are drawn each starting at the endpoint of the previous vector, unless, for some reason, the draw point has been changed. Polylines are broken by reloading the draw pointer value whenever the operator wants separate successive vectors.

The cogenerator 10 may be programmed to draw individual polylines in one of two operating modes-point-to-point and delta x/delta y. In the point-to-point mode, each vector is specified by sending to cogenerator 10 a specified endpoint which is the absolute x/y address of the specified pixel in the bit mapped memory 22. The cogenerator 10 then causes a vector to be drawn from the current DP position to the x/y position specified by the value sent. This mode of operation is provided since many display systems tend to format data in absolute values of x and y. In the embodiment described herein, the normal operating mode is point-to-point.

In delta x/delta y operation, each vector is specified with a relative x and y value. The value sent is normally the twos complement x and y parameters which are added (subtracted) to (from) the current draw pointer, which may be either the endpoint of the previous vector or a new starting point. This calculation defines the endpoint of the new vector. The cogenerator 10 then causes the new vector to be drawn from the current draw pointer to the computed endpoint. This mode of operation allows the cogenerator 10 to process polyline data that is stored in relative format. Data stored in this format allows more flexibility as to where the vector is to be ultimately drawn in the two dimensional x/y space since the vectors are drawn relative to each other rather than to absolute x/y positions.

In performing these calculations, each DDA 60 forms an independent vector generator which implements a standard Bresenham decision variable algorithm. While only one of the DDAs output data at any given time, using at least two of them allows the input of the parameters for the next vector to be calculated is performed while the current vector is drawn. In the present invention, the Bresenham algorithm solves a scaled linear equation for a line to decide between one of two future actions. In the calculation, the parametric control counter value is loaded with the maximum delta x or y and defines the number of iterations that will be taken along the independent (x) axis. For each iteration, only one of two moves is possible to go from the current to the next pixel. MOVE1 is defined as a step in the direction of the independent axis without, at the same time, incrementing along the dependent (y) axis. MOVE2 is defined as a step diagonally between the x and y axes. The MOVE1 and MOVE2 signals from the DDAs are interpreted depending on the current octant in which the line is being drawn. The control function performs this interpretation with inputs from the parametric control function and increments or decrements the x/y address counters appropriately.

The system also has the ability to fill conic and closed convex polygon areas. For purposes of discussion, a polygon can be defined as one having up to 1024 vertices and/or sides of programmable length from 0 to 4096 pixels. The starting point of the fill area is defined as the current DP value within the cogenerator 10. Polygon area fills are also rendered using Bresenham's algorithm to step along the left and right polygon edges. Polygon vertices (point to point vectors) or sides (deltax/delta y vectors) are drawn starting with the top of the polygon (minimum y coordinate). Each DDA 60 is then started in the same manner as an individual vector. When a MOVE2 (step in y) occurs in each DDA 60, the control function enables the horizontal line generator 74 to render a line between between the previous coordinates for the left and right edges. As this line is being drawn, the DDAs 60 continue the edge solutions until both reach the next MOVE2, at which time another horizontal line is drawn. This process continues until the edges close at a common point. The control program used to to do this is illustrated in FIG. 4. A similar approach is used for circles and ellipses.

The area fill generator 12 further comprises a hardware implemented parametrics conics algorithm for drawing both circles and ellipses. The implementation is such that rotated ellipses can be drawn. This algorithm approximates the continuous functions (circle and ellipse) by solving differential equations for the x and y coordinates of each pixel to be displayed. New x and y pixel values are computed by accumulating differential values for x and y concurrently. These accumulations are guided by the sin/cos lookup data tables located in the display memory 26. These tables include incremental values which vary based on the octant being drawn in. These data cause one of the addresses, either x or y, to accumulate at a faster rate than the other, with the result that the desired curved circular or elliptical conic form is generated.

The area fill generator 12 utilizes two DDAs to approximate parametric solutions for both ellipses and circles. The equations approximated for circles are:

$$x(t) = x(t-1) + R*\cos(t),$$

and $$y(t) = y(t-1) + R*\sin(t)$$

where

R = circle radius and
$0 = < t = < 2*\text{pi}$

The equations approximated for ellipses are:

$$x(t) = x(t-1) + J^* \cos(t) + K^* \sin(t)$$

and $$y(t) = y(t-1) + L^* \cos(t) + M^* \sin(t),$$

where J, K, L and M are normalized conic projections determined by the equations $$J = (x1 - x0)^* \text{Nfactor}$$

$$K = (x2 - x0)^* \text{Nfactor}$$

$$L = (y1 - y0)^* \text{Nfactor},$$

and $$M = (y2 - y0)^* \text{Nfactor},$$

where (x0, y0) are the x and y coordinates of the center of the ellipse, (x1, y1) are the x and y coordinates for one end of the major axis of the ellipse when projected from the center of the ellipse, and (x2, y2) are the x and y coordinates for one end of the mirror axis of the ellipse when projected from the center of the ellipse, and where t is as defined above and the N-normalization factor values are defined as follows:

N-Normalization factor
0000000 — Nfactor = 1
1000000 — Nfactor = 2
1100000 — Nfactor = 4
1110000 — Nfactor = 8
1111000 — Nfactor = 16
1111100 — Nfactor = 32
1111110 — Nfactor = 64
1111111 — Nfactor = 128

To draw a circle, it is merely necessary for the operator to specify two parameters, the radius and a N-normalization factor N. In this calculation, the radius is defined with 2 an 11 bit normalized value (Normrad) and the actual circle radius is determined by the equation: Radius = Normrad/Nfactor. Using the current draw pointer position as first pixel of the circle to be drawing, such drawing starting at the −90 degree point on the circumference and proceeding counterclockwise until the circumference is closed. Circles can be drawn at different x/y addresses simply by changing the draw pointer value.

In drawing an ellipse it is not necessary for the major and minor axes to orthogonal to the x and y screen coordinates so that rotated ellipses may be easily created. To draw an ellipse, the operator need only define the normalization factor n, which defines the sin/cos table to be used and the values of J, K, L and M. This is illustrated in FIG. 5, wherein P0 is the elliptical center, and the lines (P0 and P1) and (P0 and P2) define the orthogonal axes of the the ellipse. Actually major and minor axis declarations are unimportant since from a particular set of N, J, K, L and M values only one ellipse is drawn. Ellipses are drawn starting at P1 (which is equal to the draw pointer value) and moving toward P2. The draw pointer value, which defines the x/y address location where the ellipse primitive is to be drawn, is also programmable and, as with circular primitives, can be moved in the x/y space of the bit map memory 22 simply by changing the draw pointer value. The circle and ellipse drawing control sequences described above are illustrated in FIGS. 6 and 7.

Thus there has been described a new and improved integrated hardware generator for area fill, conics and vectors in a graphics rendering processor. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. An integrated hardware vector, conic and area fill primitive generator for generating digital primitive signals representative of vectors including primitive lines including polygons and conics primitives and area fills therefore, said primitive signals being used in a graphics display processor, said processor further including a display memory for storing system commands and instructions relating to the generation of said primitives, a host processor for generating said system commands, combinational means for acquiring said primitive signals and combining them with a second set of signal signals comprising symbols and a third set of digital signals comprising background and texturing signals to form a fourth digital signal comprising an output signal, said output signal being written in a predetermined address in a bit map memory of a graphics display, said primitive generator comprising:

input means for acquiring data and instructions to draw a primitive in said bit map memory; and iterative means coupled to the input means for calculating and drawing said primitives relative to a first address in said bit map memory; said iterative means including means for determining the number of iterations needed to generate a primitive line.

an address counter for storing the x and y coordinates of a pixel address in the bit map memory to which said primitive line is to be drawn;

a digital differential analyzer for accumulating components of x and y coordinate data, said analyzer comparing received x and y coordinate data with last previous x and y coordinate data stored in said analyzer and changing the x and y coordinates in said address counter when said x and y coordinates indicate that a pixel boundary has been crossed by said primitive vector line;

fetch means for acquiring sine and cosine data from said display memory for use in drawing curved primitive lines for conics primitives;

means for regulating the rates of x and y coordinate data input so that a curved primitive line is drawn;

line generator means for generating fill lines in the space bounded by drawn primitive lines; and signal means for indicating when a drawn primitive line has reached a second address in said bit map memory and for resetting the iterative means to calculate and draw a new primitive line.

2. An integrated hardware vector, conic and area fill primitive generator for generating digital primitive signals representative of vectors including primitive lines including polygons and conics primitives and area fills therefore, said primitive signals being used in a graphics display processor, said processor further including a display memory for storing system commands and instructions relating to the generation of said primitives, a host processor for generating said system commands, combinational means for acquiring said primitive signals and combining them with a second set of signal signals comprising symbols and a third set of digital signals comprising background and texturing signals to form a fourth digital signal comprising an output signal, said output signal being written in a predetermined address in a bit map memory of a graphics display, said primitive generator comprising:

input means for acquiring data and instructions to draw a primitive in said bit map memory; and iterative means coupled to the input means for calculating and drawing said primitives relative to a first address in said bit map memory; said iterative means including an x and y input digital multiplexer serially coupled to an arithmetic logic unit, whose output is coupled to a plurality of storage registers and counters that comprise a register file.

* * * * *